March 28, 1967 W. B. BANKS 3,310,974
APPARATUS FOR CALIBRATING A MEASURING APPARATUS
Filed Nov. 27, 1964 2 Sheets-Sheet 1
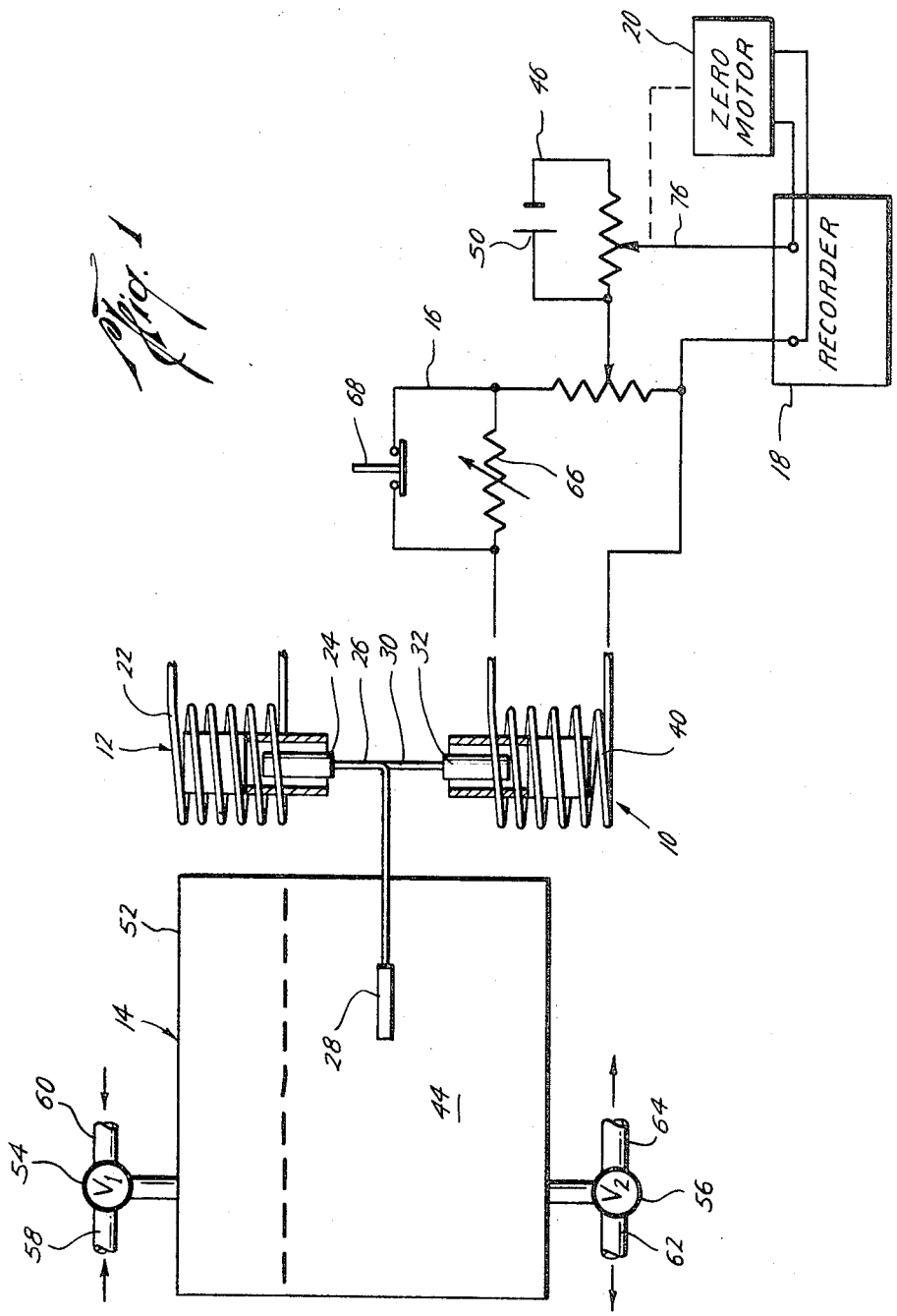
William B. Banks
INVENTOR.
BY
ATTORNEYS March 28, 1967 W. B. BANKS 3,310,974
APPARATUS FOR CALIBRATING A MEASURING APPARATUS
Filed Nov. 27, 1964 2 Sheets-Sheet 2
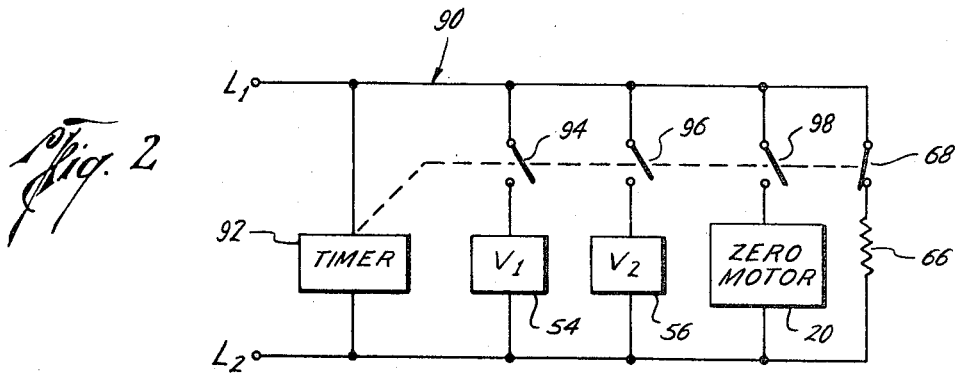
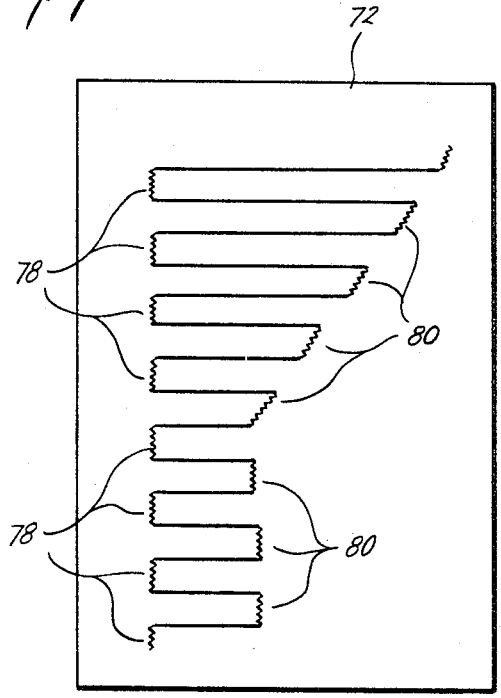 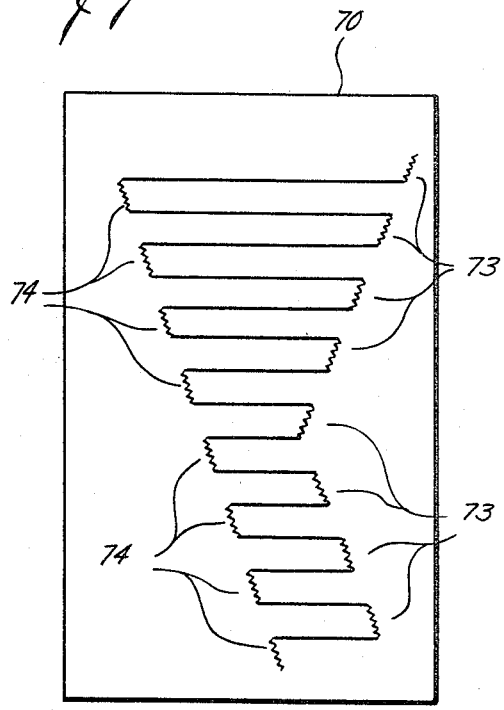
William B. Banks
INVENTOR.
BY
ATTORNEYS United States Patent Office 3,310,974
Patented Mar. 28, 1967

3,310,974
APPARATUS FOR CALIBRATING A MEASURING APPARATUS
William B. Banks, Houston, Tex., assignor to Automation Products, Inc., Houston, Tex., a corporation of Texas
Filed Nov. 27, 1964, Ser. No. 414,176
5 Claims. (Cl. 73—1)

The present invention relates to a method of and apparatus for calibrating a measuring apparatus with a reference fluid of known physical characteristics, and more particularly relates to such a method and apparatus wherein the characteristic of the reference fluid being measured is outside of the range of measurement of the measuring apparatus.

Measuring instruments which measure various physical characteristics of fluids are subject to error or drift due to such factors as temperature changes, drift of the electrical components, and material buildup on the portion of the instrument in contact with the fluid being measured. Normally, one method of calibrating or zeroing the measuring apparatus is to subject it to a reference sample of known constant physical characteristics and use the measurement of the reference sample as a standard for calibration or zeroing of the measuring apparatus. Often, however, the physical characteristic being measured of a convenient reference sample, such as air or water, is not within the measurement range of the measuring apparatus. This is particularly true in the case where the measuring apparatus has a suppressed scale which is a narrow but magnified range of measurement about the point of interest being measured in order to provide an accurate and sensitive measurement of the unknown fluid.

Therefore, it is a general object of the present invention to provide a method of and an apparatus for calibrating a measuring apparatus with a reference fluid in which the characteristic being measured is outside the range of the measuring apparatus.

Yet a further object of the present invention is a provision of a method and an apparatus for calibrating a measuring apparatus with a reference fluid of known characteristics in which the measured characteristic of the reference fluid is outside the range of the measuring apparatus by modifying the signal output of the measuring apparatus, when the apparatus is measuring the reference sample, by a factor sufficient to cause the reference measurement to fall within the range being measured.

Yet a further object of the present invention is the provision of a method of and an apparatus for calibrating a measuring apparatus which normally measures a particular characteristic of a first fluid by measuring a reference fluid of known characteristics by periodically flowing the reference fluid to the measuring apparatus, and when the apparatus is measuring the reference fluid modifying the output signal of the apparatus by a constant factor sufficient to cause the reference measurement to fall within the range being measured, and zeroing the measuring apparatus with the modified output signal measurement of the reference fluid.

Still a further object of the present invention is the provision of a method of and an apparatus for calibrating a measuring apparatus which normally measures a particular characteristic of a first fluid by measuring the same characteristic of a reference fluid of a known characteristic which is outside the range being measured, and providing flow control means for alternately flowing the first fluid and the reference fluid to a measuring instrument, providing a recorder connected to and receiving the output signal from the measuring instrument, and an attenuating circuit connected to the measuring instrument and recorder for modifying the output signal from the measuring instrument to cause the value of the reference fluid measurement to fall within the range of the recorder, and providing timer means connected to the flow control means and the attenuating circuit for periodically flowing the reference fluid to the measuring instrument and attenuating the signal output thereby calibrating said apparatus.

Yet a still further object of the present invention is the improvement in a method of and an apparatus for calibrating a measuring instrument which normally measures a particular characteristic of a first fluid on a recorder which has a suppressed scale by measuring the same characteristic of a reference fluid wherein valve means are provided for alternately flowing the first fluid and the reference fluid to the measuring instrument, the signal output from the measuring instrument is transmitted to the recorder, and wherein the characteristic of the reference fluid being measured is outside the range of the suppressed scale by providing an attenuating circuit connected between the measuring instrument and the recorder changing the signal output from the measuring instrument by a fixed factor sufficient to cause the measurement of the reference fluid to fall within the suppressed scale, and timer means connected to the valve means and to the attenuating circuit for periodically flowing the reference fluid to the measuring instrument and attenuating the output signal from the instrument so that it will be within the suppressed scale thereby calibrating the apparatus.

Other and further objects, features and advantages will be apparent from the following description of a presently preferred embodiment of the invention, given for the purpose of disclosure and taken in conjunction with the accompanying drawings, wherein, FIGURE 1 is an electrical and mechanical schematic diagram illustrating the process and apparatus according to the present invention, FIGURE 2 is an electrical schematic of an automatic timing and calibrating circuit, FIGURE 3 is a recording chart illustrating the results of the present invention when the measuring apparatus is both calibrated and zeroed, and FIGURE 4 is a recording chart resulting from the present invention wherein the measuring apparatus has been calibrated, but not zeroed.

Referring now to the drawings, and particularly to FIGURE 1, the reference numeral 10 generally designates the measuring apparatus of the present invention and generally includes a measuring instrument 12, a fluid control means 14, an attenuation circuit 16, a recorder 18, and a zeroing motor 20.

The measuring instrument 12 may be any suitable measuring instrument for measuring physical properties of materials and by way of example only may be one such as more fully disclosed and described in my Patent No. 3,100,390. Using such a device, an electrical input signal is supplied to electromagnetic coil 22 to energize and vibrate armature 24 and flexible rod 26 thereby causing the sensing element or paddle 28 to vibrate at the applied frequency. The vibration of the sensing element 28 will be in turn transmitted to the flexible rod 30 and to armature 32. The signal output coil 34 generates a voltage caused by the vibration of the armature 32 which is proportional to the amplitude of vibration of the sensing element 28. Thus, selected physical characteristics of a fluid 44 such as density, viscosity, or specific gravity can be measured and a signal output from coil 40 will be a measurement of the value or change in the value of the physical property of the fluid 44 being measured. Generally, the signal output from the measuring instrument 12 is transmitted to a recorder 18 for recording that signal thereby giving a visual and permanent record of the measurement of the particular characteristic of the fluid 44 being measured. Frequently, in order to magnify the value of the measurement being taken on an enlarged scale a suppressed scale circuit 46 is provided to transmit a voltage such as from battery 50 opposite to the output signal of the measuring instrument 12 to provide a suppressed scale on the recorder 18 whereby minute changes in the measurement being made are magnified thereby increasing the accuracy and sensitivity of the measurement.

However, the accuracy of all measuring instruments changes with time due to material deposits on the sensing element 28, temperature changes, and drift of the electrical components. It has been the practice in the past to periodically calibrate the measuring apparatus 10 by flowing a reference fluid of known characteristics to the measuring instrument 12 which will serve as a reference. Therefore, fluid control and an outlet valve 56 in communication with the container 52 are provided to alternately flow the fluid to be measured and the reference fluid through the container 52. Thus, when valve 54 is actuated in one direction the first fluid may enter through line 58 and when the valve 54 is actuated in the other direction, the reference fluid may flow through line 60 into the container 52. Similarly, when valve 56 is actuated in one direction, the fluid in the container 52 may flow out line 62 and when the valve 56 is actuated in the other direction fluid may flow out line 64.

It is desirable in many cases to use convenient reference fluids which are readily available, such as air and water. However, these fluid may have a characteristic which is being measured in which the output signal from the measuring instrument 12 will not fall within the measuring range on the recorder 18, and particularly in the case in which the recorder has a suppressed scale. Therefore, an attenuation circuit 16 is provided between the measuring instrument 12 and the recorder 18 for modifying the signal output of the measuring instrument 12 when the instrument is measuring the reference fluid sample by a fixed factor sufficient to cause the reference measurement to fall within the range being measured on the recorder. Thus, resistor 66, which may be variable for making adjustments, is provided to attenuate or modify the output signal from the measuring instrument 12 prior to transmitting it to the recorder 18. The attenuating circuit 16 includes a switch 68 which is normally closed thereby by passing the attenuating resistor 66 during measurement of the characteristic of the unknown fluid. When the reference fluid is supplied to the measuring instrument 12 the switch 68 is then actuated to place the attenuating resistor 66 into the circuit to modify the output signal by a fixed factor to cause the output signal to fall within the range of measurements of the recorder 18, thereby allowing the use of more convenient reference samples.

Referring now to FIGURE 4, the signal output from the measuring instrument 12 is recorded on a chart 70 of the recorder 18 whereby for example only the output measurement of the fluid being measured is indicated by the recordings 73 at the right hand side of the chart. The alternate recordings 74 on the left hand side of the chart represent the signal measurement of the reference material. Therefore, the true measurement of the characteristic being measured of the unknown fluid is the difference between the measurements 73 and 74. However, in order to avoid measuring the differential between the two recordings on the chart 72, it is preferable to have the reference fixed or calibrated at a zero point so that the deviation of the unkown measurement can be directly read from the chart.

Thus, referring again to FIGURE 1, a zero motor 20 such as a conventional servo-mechanism, receives the signal output to the recorder 18, when the reference sample is being measured, and is mechanically coupled to the potentiometer 76. The zero motor 20 is actuated and makes an adjustment each time the reference fluid is being measured to calibrate or zero the reference measurement at a predetermined position on the chart. Thus, a chart 72, as best seen in FIGURE 3, is provided wherein the recording of the reference signals 78 are alternately provided aligned or zeroed on the chart 72. The alternate recordings 80 of the unknown fluid being measured are recorded on the chart 72 and may be read directly to note the change in value of the physical value of the unknown fluid being measured.

Referring now to FIGURE 2, an automatic timer circuit 90 may be provided to automatically and periodically actuate the various components of the apparatus 10 to calibrate and zero the apparatus. Thus, a timer 92 is provided which is periodically actuated to in turn control switches 94, 96, 98, and 68. Thus, when the timer is actuated, switches 94 and 96 are closed to actuate the valves 54 and 56 in a direction to dump the fluid being measured and flow the reference sample fluid to the container 52. Also, switch 68 opens placing the attenuating resistor 66 into the circuit for attenuating or modifying the signal output when the instrument 12 measures the reference sample. In addition, the timer 92 closes switch 98 which energizes the zero motor 20 for calibrating or zeroing the reference sample measurement on the graph of the recorder 18.

In use, the measuring apparatus 10 normally measures a particular physical characteristic of the fluid in the container 52. Thus, the fluid to be measured enters conduit 58, through valve 54, and into the container 52. If the measurement is a continuous measurement instead of a batch process, the fluid being measured will also flow out of the container 52 through the valve 56 and the outlet conduit 62. The measuring instrument 12 will measure the desired physical characteristics of the fluid and will provide an output signal from coil 40 which will be transmitted to the recorder 18 and will bypass the attenuation circuit 16 by flowing through the closed switch 68 and around the attenuating resistor 66. The output signal will be recorded on the chart 70 (FIGURE 4) or the chart 72 (FIGURE 3) as indicated by the recordings 73 and 80, respectively, depending upon whether a zeroing reference is used. In order to calibrate the apparatus 10, valves 54 and 56 are actuated to cut off the flow of the unknown measuring fluid to the container 52 and to substitute a reference fluid through the inlet conduit 60 and outlet conduit 64. As previously mentioned, the reference fluid may be one which is readily available, but in which the output signal from the measuring instrument 12 does not fall upon the scales of the graphs 70 and 72 of the recorder 18, particularly when a suppressed circuit 46 is used to have a suppressed scale on the charts 70 and 72. However, the opening of the switch 68 causes the output signal from the measuring instrument 12 to pass through the attenuating resistor 66 which has been adjusted to a fixed value to cause the output signal due to the reference fluid to fall within the scale of the recorder used on charts 70 and 72. This reference signal will be indicated as recording 74 on chart 70 and recording 78 on chart 72 (FIGURE 3).

On chart 70 of FIGURE 4 the difference between the measurement 73 and 74 would be a true indication of the measurement of the fluid being measured. However, by using the zeroing motor 20 which receives the attenuated output signal of the reference fluid and zeros potentiometer 76 to a constant zero or calibrating reference as shown by recordings 78 of FIGURE 3. That is, the zeroing motor 20 receives the attenuated output signal of the reference fluid and adjusts the potentiometer 76 to align or zero the suppressed circuit 46 and provide a calibrated reference for the reference signal 78 which makes the recordings 80 readable directly from the chart 72 instead of having a differential reading as on chart 70 in FIGURE 4.

And, of course, the automatic timing circuit 90, as best seen in FIGURE 2, may be utilized to periodically actuate the valves 54 and 56, the zero motor 20, and the attenuating resistor 66 for providing an automatic and periodic calibration of the apparatus 10.

It is believed that the method of the invention is apparent from the foregoing description of the presently preferred apparatus of the invention. The method, however, comprises the steps of calibrating a measuring instrument with a reference fluid which has a characteristic being measured that is not within the instrument measurement range by modifying the signal output of the measuring apparatus when the apparatus is measuring the reference sample by a factor sufficient to cause the reference measurement to fall within the range being measured. The method further comprehends the method of calibrating a measuring instrument which normally measures a particular characteristic of a first fluid by measuring a reference fluid of known characteristics by periodically flowing the reference fluid to the measuring apparatus and when the apparatus is measuring the reference fluid, modifying the output signal of the apparatus by a factor sufficient to cause the reference measurement to fall within the range being measured, and zeroing the measuring apparatus with the modified output signal measurement of the reference fluid.

The present invention, therefore, is well adapted to carry out the objects and attain the ends and advantages mentioned as well as others inherent therein. While a presently preferred embodiment of the invention is given for the purpose of disclosure, numerous changes in the details of construction, arrangement of parts, and steps of the process may be made which will readily suggest themselves to those skilled in the art and which are encompassed within the spirit of the invention and the scope of the appended claims.

What is claimed is:

1. In an apparatus for calibrating a measuring apparatus which normally measures a particular characteristic of a first fluid by measuring the same characteristic of a known reference fluid which has a value outside the range being measured comprising,
    timer means for periodically calibrating said apparatus,
    valve means actuated by said timer means to periodically flow said reference fluid to said measuring apparatus,
    an attenuating circuit actuated by said timer means to modify the output signal from said measuring apparatus to cause the measurement of the reference fluid to fall within the range of values being measured.

2. An apparatus for calibrating a measuring apparatus which normally measures a particular characteristic of a first fluid by measuring the same characteristic of a reference fluid of a known characteristic which is outside the range being measured comprising,
    a measuring instrument for measuring a particular physical characteristic of the fluid,
    flow control means for alternately flowing said first fluid and said reference fluid to said measuring instrument,
    a recorder connected to and receiving the output signal from the measuring instrument,
    an attenuating circuit connected to said measuring instrument and recorder for modifying the output signal from the measuring instrument to cause the value of the reference fluid measurement to fall within the range of the recorder, and
    timer means connected to said flow control means and attenuating circuit for periodically flowing the reference fluid to said measuring instrument and attenuating the output thereby calibrating said apparatus.

3. An apparatus for calibrating a measuring apparatus which normally measures a particular characteristic of a first fluid by measuring the same characteristic of a known reference fluid which is outside the range being measured comprising,
    a fluid container for holding said fluid,
    valve means connected to said container for alternately flowing said first fluid and said reference fluid to said container,
    a measuring instrument for measuring a particular physical characteristic of the fluid in the container,
    a recorder connected to and receiving the output signal from the measuring instrument,
    signal suppressing means connected between the recorder and the measuring instrument for creating a suppressed scale on said recorder,
    an attenuation circuit including and controlled by an attenuation switch connected to the output from the measuring instrument for providing a signal when measuring the reference fluid which will be within the suppressed scale,
    timer means connected to said valve means and attenuation switch for periodically flowing reference fluid to said measuring instrument and attenuating the signal output thereby calibrating said apparatus.

4. The apparatus of claim 3 including,
    a zeroing motor receiving said signal to the recorder and connected to said timer means for zeroing the signal input to the recorder when actuated.

5. In an apparatus for calibrating a measuring instrument which normally measures a particular characteristic of a first fluid on a recorder having a suppressed scale by measuring the same characteristic of a reference fluid wherein valve means are provided for alternately flowing the first fluid and the reference fluid to the measuring instrument and the signal output from the measuring instrument is transmitted to a recorder having a suppressed scale, the improvement when the characteristic of the reference fluid being measured is outside the range of the suppressed scale comprising,
    an attenuating circuit connected between the measuring instrument and the recorder changing the signal output from the measuring instrument by a factor sufficient to cause the measurement of the reference fluid to fall within the suppressed range, and
    timer means connected to the valve means and to the attenuating circuit for periodically flowing reference fluid to the measuring instrument and attenuating the output signal from the instrument so that it will be within the suppressed scale thereby calibrating the apparatus.

References Cited by the Examiner

UNITED STATES PATENTS

| 1,707,624 | 4/1929 | Brown | 73—27 |
| 2,197,370 | 4/1940 | Sullivan | 73—27 X |
| 2,887,654 | 5/1959 | Strassman et al. | 73—1 |

FOREIGN PATENTS

| 1,169,692 | 5/1964 | Germany. |

LOUIS R. PRINCE, *Primary Examiner.*

S. C. SWISHER, *Assistant Examiner.*